United States Patent Office 3,113,031
Patented Dec. 3, 1963

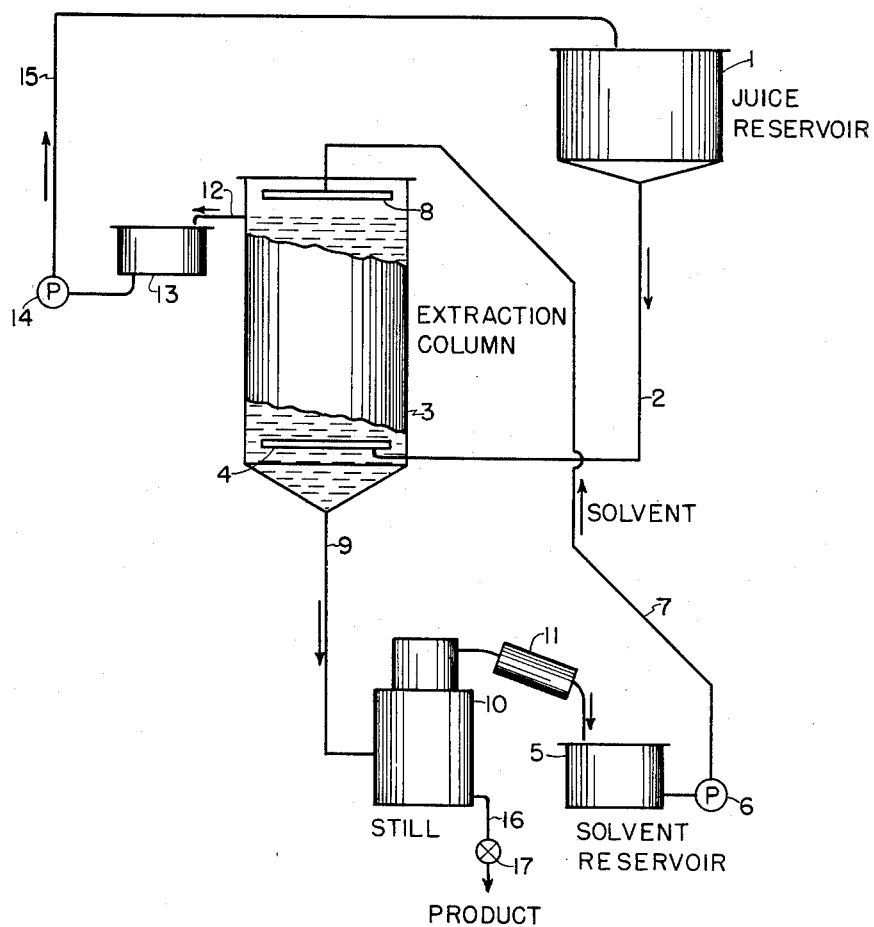

3,113,031
EXTRACTION OF FLAVORS
William L. Stanley, Richmond, and John E. Brekke and Roy Teranishi, Berkeley, Calif., assignors to the United States of America as represented by the Secretary of Agriculture
Filed July 19, 1962, Ser. No. 211,146
7 Claims. (Cl. 99—140)
(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates to and has among its objects the provision of novel processes for isolating flavors from fruits or vegetables, particularly from fruit juices. Further objects of the invention will be evident from the following description wherein parts and percentages are by weight unless otherwise specified.

The FIGURE in the annexed drawing is a schematic diagram or flow-sheet of a continuous extraction system embodying the principles of the invention.

It is well known that plant materials such as fruits contain small but significant amounts of volatile flavoring materials. These materials provide characteristic flavors to the fresh produce and are, in large measure, responsible for their appeal to the palate. When fresh produce is processed by conventional techniques such as dehydration, much of the volatile flavor is lost by evaporation and as a consequence the preserved product is flat or lacking in natural aroma. It is thus often desirable to restore flavor to the preserved products so that they will more closely resemble the fresh produce. In order to accomplish this it is necessary to isolate the natural flavoring components in a concentrated form suitable for incorporation into flavor-deficient products.

These compositions of volatile flavoring components, or essences as they are often termed, are conventionally made by distillation procedures. For example, fruit is reduced to a liquid state such as a juice and this juice is treated with steam to vaporize or strip off the flavoring components. The resulting vapor is condensed and then rectified in an efficient distillation column. The resulting essence does not contain solely the flavoring components but is largely water and alcohol with but a very minor proportion of the actual flavoring matter. Although the essences are concentrated to a substantial degree, representing a concentration of flavoring materials from 100 to 1000 times as great as in the original juice, at best they remain a solution of a very minor proportion of the flavoring components in a major proportion of water and alcohol. In this connection it must be realized that the flavoring components are not individual compounds but the flavor of each commodity is a complex mixture of many different compounds such as esters, ethers, aldehydes, ketones, etc., in a wide range of molecular weights. Purification by distillation can never be completely effective because many of the individual flavor components have boiling points close to that of alcohol and water or form azeotropes with water or alcohol. Thus, too sharp a fractionation will result in removal of important elements of flavor. Also, there is the fact that the flavoring components are sensitive to heat so that even under the best of conditions chemical changes take place during the distillation with the result that the essences have what may be termed a "cooked" aroma and lack the true natural bouquet of the fruit from which they were prepared.

In accordance with the present invention, volatile flavoring essences are isolated by a process of extraction, using particular solvents which have the unique ability to dissolve the volatile flavoring components while rejecting (not dissolving) the undesired components of the plant material, namely, water, carbohydrates, fruit acids (citric, tartaric, malic, etc.), inorganic salts, proteins, etc.

The process of the invention yields many advantages over prior procedures. Among these are the following:

A primary advantage of the process of the invention is that the flavoring substances are isolated in substantially pure form. In particular, the products of the invention are essentially free from water and alcohol, these being the major impurities in conventional essences.

Another advantage is that the products of the invention have essentially the same flavor as the natural produce from which they are prepared; that is, they retain the aroma of the fresh produce instead of exhibiting the "cooked" aroma of conventional distilled essences.

A major factor which contributes to the advantage outlined immediately above is that in the isolation procedure of the invention, the flavoring principles are not subjected to elevated temperatures. The extracting solvents used in accordance with the invention are effective in the extraction step at non-elevated temperatures and, moreover, can be removed from the resulting extracts at non-elevated temperatures.

Another advantage of the invention is that the solvents used are non-inflammable and non-explosive. This greatly simplifies the extraction and solvent removal steps since there is no hazard of fire or explosion to contend with.

A further advantage to be mentioned is that the solvents used in accordance with the invention are essentially odorless so that they do not interfere with or alter the natural aroma of the flavoring principles. Also, the solvents are non-toxic so that their use with food products is safe.

An item to be mentioned is that the solvents used in accordance with the invention do not emulsify with the materials being extracted so that separation of the extract phase is accomplished readily and efficiently. This separation is particularly aided by the relatively high density (ranging from 1.2 to 1.6) of the solvents used herein whereby they tend to quickly settle to the bottom of the extraction zone. Such a rapid settling is to be contrasted with systems wherein solvents are used which have densities near that of water. In such cases, separation is slow and inefficient because the density differential is insufficient to adequately force the phase separation.

A further advantage to be noted is that the solvents used in accordance with the invention are inert; that is, they do not react with the components of the material being extracted. Moreover, the solvents do not hydrolyze so that there is no contamination of the product and the recovered solvent can be used over and over again.

In proceeding in accordance with the invention, the fresh produce to be treated is first reduced to a liquid state. This may be done in conventional manner as by subjecting the produce to such operations as reaming, pressing, macerating, crushing, comminuting, extracting with water, or the like. The liquid preparation, or juice, is then contacted with the solvent. For best results it is preferred that the extraction be performed in a countercurrent system. An embodiment of such mode of procedure is detailed hereinbelow. After the extraction has been accomplished the solvent phase containing dissolved volatile flavoring principles is separated from residual liquid and this solvent phase is subjected to evaporative conditions to vaporize the solvent and leave the flavoring principles as a residue. During this vaporization, alcohol present in the solvent phase is vaporized together with the solvent. The amount of extracting solvent is not a critical factor; generally one uses about 0.1 to 10 parts of solvent per part of liquid to be extracted. It is obvious that conventional procedures known in the art, such as repeated application, may be applied to obtain exhaustive extraction of the flavoring principles. After evaporation of the solvent from the extract phase, the flavoring principles are obtained as a residue in a highly concentrated form essentially free from water and alcohol and possessing the true natural aroma of the produce from which they were extracted. The products may be employed for flavoring products of all kinds, for example, concentrated fruit juices, dehydrated fruit juices, gelatin dessert mixes, pudding mixes, cake mixes, confections such as ices, sherbets, ice cream. Essences produced in accordance with the invention from such vegetables as onions, garlic, parsley, celery, pimientos, tomatoes, and chives, may be used in flavoring such products as salad dressings, cheese dips, cheeses, sauces for alimentary pastes, dehydrated soups, pizza mixes, and the like.

The solvents used in accordance with the invention are fluorinated hydrocarbons, preferably fluorinated derivatives of methane, ethane, or cyclobutane. These compounds may contain other halogen groups such as bromine or chlorine in addition to the fluorine groups. Typical compounds which may be used are listed below by way of illustration but not limitation:

| Solvent | Formula | Boiling point 0° F. | ° C. |
|---|---|---|---|
| Tetrafluoromethane | $CF_4$ | −198.4 | −128.0 |
| Trifluoromethane | $CHF_3$ | −115.7 | −82.1 |
| Trifluoromonochloromethane | $CClF_3$ | −114.6 | −81.4 |
| Hexafluoroethane | $CF_3-CF_3$ | −108.8 | −78.2 |
| Trifluoromonobromomethane | $CBr F_2$ | −72.0 | −57.8 |
| Difluoromonochloromethane | $CHClF_2$ | −41.4 | −40.8 |
| Pentafluoromonochloroethane | $CClF_2-CF_3$ | −37.7 | −38.7 |
| Difluorodichloromethane | $CCl_2F_2$ | −21.6 | −29.8 |
| 1,1-difluoroethane | $CH_3-CHF_2$ | −11.2 | −24.0 |
| Symmetrical tetrafluorodichloroethane | $CClF_2-CClF_2$ | 38.4 | 3.6 |
| Monofluorodichloromethane | $CHCl_2F$ | 48.1 | 8.9 |
| Monofluorotrichloromethane | $CCl_3F$ | 74.8 | 23.8 |
| Symmetrical tetrafluorodibromoethane | $CBr_2F_2-CBr_2F_2$ | 117.5 | 47.5 |
| Trifluorotrichloroethane | $CCl_2F-CClF_2$ | 117.6 | 47.6 |
| Octafluorocyclobutane | $\begin{array}{c} CF_2 \\ CF_2 \quad CF_2 \\ CF_2 \end{array}$ | 21.1 | −6.0 |

Depending on the boiling point of the solvent selected, it may be necessary to conduct the extraction under superatmospheric pressure to maintain the solvent in the liquid state. Usually, it is preferred to conduct the extraction under atmospheric pressure conditions and for that reason we prefer to use those solvents which are normally liquid. To avoid any possibility of heat damage to the flavoring principles and to avoid loss thereof through evaporation, the extraction is conducted at about room temperature (75° F.) or below. Preferably, the extraction is conducted at temperatures just above the freezing point of the juice being extracted—for instance, at about 20–50° F.—whereby the possibility of flavor loss or deterioration is reduced to a minimum. It is obvious that the freezing point of the juice to be extracted will vary markedly, depending on such factors as the concentration of sugar therein and with some juices of high sugar concentration one might be able to conduct the extraction at say 20° F. whereas other juices of lesser sugar concentration might require a higher extraction temperature, say 33° F., so that they will remain liquid. In applying the process of the invention, the second step involves evaporation of solvent from the extract. Since the flavoring principles in the extract, as well as the solvent, are volatile it is preferred that this evaporation step be conducted at as low a temperature as possible; that is, by selecting a solvent which is vaporizable at a low temperature. Taking into account the above-described factors, that is, the desirability of using a solvent which is liquid at atmospheric pressure but which can be removed from the extract phase at a minimum temperature, we prefer to use those solvents which have boiling points about from 20 to 75° F., typical examples of these preferred solvents being octafluorocyclobutane (B.P. 21.1° F.), symmetrical tetrafluorodichloroethane (B.P. 38.4° F.), monofluorodichloromethane (B.P. 48.1° F.), and monofluorotrichloromethane (B.P. 74.8° F.).

In the annexed drawing there is depicted a schematic diagram of a system for countercurrent extraction in accordance with the principles of the invention. Referring to the drawing, the system includes a reservoir 1 for holding a supply of juice to be extracted, apple juice for instance. The juice flows from reservoir 1 through conduit 2 to extracting column 3. To disperse the juice there is provided a sparger 4—a circular pipe having small openings. Conduit 2 is connected to this sparger so that the juice flows into the column through the small openings. The juice, being of lighter density than the extracting solvent, moves upwardly in the extracting column. A reservoir 5 is provided for holding a supply of solvent—symmetrical dichloro-tetrafluoro-ethane, for example. The solvent is forced by pump 6 through conduit 7 and sparger 8 into the top of column 3. Because of its heavy density, the solvent moves downwardly in the column while dissolving flavoring principles from the rising juice. The resulting solvent phase (extract) flows through conduit 9 into still 10, maintained at a temperature somewhat above the boiling point of the solvent. Vaporized solvent is condensed in condenser 11 and flows into solvent reservoir 5 from which it is recirculated into the system as previously described. Meanwhile, juice rising to the top of column 3 flows out of overflow conduit 12 into holding tank 13 from which it is forced by pump 14 through conduit 15 into reservoir 1. From this reservoir the juice is recirculated back into the system as described. From time to time, the residue in still 10—the extracted essence—may be withdrawn via conduit 16 and valve 17.

The invention is of wide applicability and can be used for the isolation of volatile flavoring components from all types of fruits and vegetables. Typical examples of such materials are listed below by way of illustration: Apples, pears, apricots, peaches, prunes, plums, cherries, strawberries, raspberries, grapes, pineapple, oranges, lemons, limes, grapefruit, celery, parsley, onions, chives, leeks, garlic, pimientos, tomatoes, watercress, and the like.

The invention is further demonstrated by the following illustrative examples:

*Example 1*

Raw Winesap apples were crushed to produce juice. This juice was extracted with symmetrical dichloro-tetrafluoro-ethane, using a countercurrent system essentially as shown in the annexed drawing. The system was initially supplied with juice and solvent in the proportion of 1 gallon juice to 500 ml. solvent. The extraction was continued for 6 hours, recirculating the solvent and juice as described. The rate of flow of solvent was approximately 15 ml./minute and that of juice approximately 1 gallon per hour. The extraction column 3 was held at 35° F. and still 10 was held at 15° C. (59° F.). At the end of the 6-hour extraction period the apparatus was shut down and the contents of still 10 and residual solvent phase in column 3 were combined and the composite allowed to stand at room temperature to permit evaporation of solvent. The yeild of essence was 3.5 mg. per gallon of juice. This product was found to be free from alcohol and water. A sample of the product and a sample of conventional distilled apple essence were submitted to a panel skilled in judging aroma of food products and it was found that the aroma of the product was superior in that it preserved the natural bouquet of the fresh apples.

Example 2

In order to quantitatively demonstrate the preferential extraction effect, the process of the invention was applied to a synthesized "juice." This material was made by combining the following ingredients:

| Ingredient: | Parts |
|---|---|
| n-Butyl acetate | 1 |
| Iso-butyl acetate | 1 |
| n-Amyl acetate | 1 |
| Iso-amyl acetate | 1 |
| Ethanol | 1 |
| Water | 250 |

This mixture was extracted in a separatory funnel with an equal volume of symmetrical dichloro-tetrafluoro-ethane at 35° F. The solvent phase was separated, then held at 15° C. (59° F.) to evaporate off the solvent. The solvent-free residue was then analyzed in a chromatographic apparatus of the dual-hydrogen flame ionization detector type. The results are tabulated below:

COMPOSITION OF PRODUCT

| Ingredient: | Concentration, percent |
|---|---|
| n-Butyl acetate | 24.94 |
| Iso-butyl acetate | 24.94 |
| n-Amyl acetate | 24.94 |
| Iso-amyl acetate | 24.94 |
| Ethanol | 00.25 |
| Water | 0 |

Having thus described the invention, what is claimed is:

1. A process for isolating the volatile flavoring components from a juice selected from the group consisting of fruit juice and vegetable juice which comprises extracting the juice with a fluorinated hydrocarbon solvent, separating the extract phase containing dissolved flavoring components from the residual juice, and evaporating solvent from the separated extract phase.

2. A process for isolating volatile flavoring components which comprises crushing fresh produce selected from the group consisting of fruits and vegetables to prepare a juice, extracting the resulting juice with a fluorinated hydrocarbon solvent, separating the extract phase containing dissolved flavoring components from the residual juice, and evaporating solvent from the separated extract phase.

3. A process for isolating the volatile flavoring components from a fruit which comprises crushing fresh fruit to prepare a juice, extracting the resulting juice with a fluorinated hydrocarbon solvent at a temperature about from 20 to 75° F., separating the extract phase containing dissolved flavoring components from the residual juice, and evaporating solvent from the extract phase.

4. A process for isolating the volatile flavoring components from a fruit juice which comprises extracting the fruit juice, at a temperature about from 20 to 75° F., with a fluorinated hydrocarbon solvent having a boiling point not over 75° F., separating the extract phase containing dissolved flavoring components from the residual juice, and evaporating solvent from the extract phase.

5. A process for isolating the volatile flavoring components from a fruit juice which comprises extracting the fruit juice at a temperature of about 35° F. with a fluorinated hydrocarbon solvent having a boiling point not over 75° F., separating the extract phase from residual juice, and evaporating solvent from the extract phase.

6. The process of claim 5 wherein the fluorinated hydrocarbon solvent is symmetrical tetrafluorodichloroethane.

7. A continuous process for isolating volatile flavoring components from a fruit or vegetable juice which comprises continuously flowing a fluorinated hydrocarbon solvent into the top of an extraction zone, continuously and concomitantly flowing a fruit or vegetable juice into the extraction zone near the base thereof, continuously withdrawing extract phase from the base of the said extraction zone, continuously flowing said extract phase into an evaporation zone wherein solvent is vaporized from the said extract phase, and withdrawing from the evaporation zone the residual material constituting the isolated volatile flavoring components.

References Cited in the file of this patent
UNITED STATES PATENTS

| 2,134,380 | Stange | Oct. 25, 1938 |
| 2,180,932 | Stockelbach | Nov. 21, 1939 |
| 2,663,670 | Francis et al. | Dec. 22, 1953 |